US008896432B2

(12) United States Patent
Kang et al.

(10) Patent No.: US 8,896,432 B2
(45) Date of Patent: Nov. 25, 2014

(54) COOPERATIVE EVENT DATA RECORD SYSTEM AND METHOD

(71) Applicant: Industrial Technology Research Institute, Hsinchu (TW)

(72) Inventors: Po-Chun Kang, Chiayi County (TW); Tzu-Hsiang Su, Taichung (TW); Ping-Fan Ho, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 130 days.

(21) Appl. No.: 13/628,903

(22) Filed: Sep. 27, 2012

(65) Prior Publication Data

US 2013/0285803 A1 Oct. 31, 2013

(30) Foreign Application Priority Data

Apr. 25, 2012 (TW) ............................. 101114715 A

(51) Int. Cl.
*B60Q 1/00* (2006.01)

(52) U.S. Cl.
USPC ........................................ 340/436; 340/425.5

(58) Field of Classification Search
CPC combination set(s) only.
See application file for complete search history.

(56) References Cited

U.S. PATENT DOCUMENTS

| | | | | |
|---|---|---|---|---|
| 2005/0259151 | A1* | 11/2005 | Hamilton et al. | 348/148 |
| 2007/0135980 | A1 | 6/2007 | Plante | |
| 2008/0111666 | A1* | 5/2008 | Plante et al. | 340/425.5 |
| 2009/0306848 | A1* | 12/2009 | Kohsaka et al. | 701/33 |
| 2011/0006886 | A1* | 1/2011 | Park | 340/10.5 |
| 2011/0057783 | A1* | 3/2011 | Yagi et al. | 340/436 |
| 2013/0300552 | A1* | 11/2013 | Chang | 340/436 |

FOREIGN PATENT DOCUMENTS

| | | | |
|---|---|---|---|
| TW | 200828193 | A | 7/2008 |
| TW | 200846222 | A | 12/2008 |

OTHER PUBLICATIONS

Young et al., "Cooperative Collision Warning Based Highway Vehicle Accident Reconstruction", Eighth International Conference on Intelligent Systems Design and Applications, pp. 561-565, Nov. 2008.

Perez et al., "Argos: An Advanced In-Vehicle Data Recorder on a Massively Sensorized Vehicle for Car Driver Behavior Experimentation", IEEE Transactions on Intelligent Transportation Systems, vol. 11, No. 2, pp. 463-473, Jun. 2010.

He et al., "Research on vehicle travelling data recorder based on Radio Frequency Identification (RFID)", International Conference on Industrial Mechatronics and Automation, pp. 232~235, May 2009.

Hao et al., "The Research of Vehicle Driving Multimedia Data Recording", Intelligent Information Hiding and Multimedia Signal Processing, 2008. IIHMSP '08 International Conference, pp. 1412-1415, Aug. 2008.

Young et al., "Highway vehicle accident reconstruction using Cooperative Collision Warning based Motor Vehicle Event Data Recorder", Intelligent Vehicles Symposium, 2009 IEEE, pp. 1131-1136, Jun. 2009.

* cited by examiner

*Primary Examiner* — Travis Hunnings
(74) *Attorney, Agent, or Firm* — Rabin & Berdo, P.C.

(57) ABSTRACT

A cooperative event data record system includes an in-car system working cooperatively with a communication system. The in-car system has a communication module, a cooperative event record processing unit and an impact determination module. The cooperative event record processing unit connects to the communication module, the impact determination module and an event data record unit. The impact determination module transmits a signal to the cooperative event record processing unit. The communication module transmits a request from the cooperative event record processing unit to a communication module element of the communication system, and receives a response from the communication module element. According to the response, the cooperative event record processing unit stores at least a video data to the event data record unit, or retrieves video data from the event data record unit.

14 Claims, 16 Drawing Sheets

COOPERATIVE EVENT DATA RECORD SYSTEM AND METHOD

CROSS-REFERENCE TO RELATED APPLICATION

The present application is based on, and claims priority from, Taiwan Application No. 101114715, filed Apr. 25, 2012, the disclosure of which is hereby incorporated by reference herein in its entirety.

TECHNICAL FIELD

The disclosure generally relates to a cooperative event data record system and method.

BACKGROUND

With the technology development of automotive electronics, the car is no longer only for driving, there exists more demand-driven market opportunities of automotive equipment for many applications. In recent years, automotive merchandise even considers road safety, driving comfort, and driving energy efficiency, etc. Wherein the car video recorder becomes increasingly popular and provides scene restoring for the occurrence of traffic accidents or disputes. Early car video recorder is similar to the black box installed in the car, to record electronic data on driving by linking with electronic systems, but the interpretation of these data is not easy.

One mainstream of the car video recorder consists of optical recording device and storage device. This car video recorder performs video recording and stores video data of road condition when driving, to provide usage for emergencies. As the increasing demand of drivers for the car video recorder, in addition to recording functionality, technology of global positioning system (GPS) and gravity sensor (G-Sensor) are also integrated into the car video recorder. Wherein the global positioning system may provide recording of global positioning system trajectory when records videos, and may clearly indicate the location of the car in the video. The gravity sensor may determine if an accident occurs or the car body destroyed through the vibration sign of the car body, to drive the car video recorder to perform special storage for video or other corresponding behavior, which is reserved for event related evidences.

The responsibility determination of the accident is usually favorable to the one that was hit, but the proportion of causing car accident due to the front car is not small. The car video recorder usually set the camera in front of the car for taking video of the driving direction, capable of monitoring the front scene when driving behind to protect its own interest on the occurrence of accident.

The camera range of the car video recorder may be subject to many limitations, after many car accidents occur, the video in the car video recorder is often unable to provide effectively video for clarifying the event clearly, or when the party holds the decisive video of the accident absconds, it is difficult to blame their responsibilities. Therefore, there is a so-called "human flesh search" way, that is, the parties put location, date, time information of the incident on the Internet, to seek taken and stored videos of other car video recorder at this location to obtain the critical videos of the accident. However, due to the limited space for storing videos, the car video recorder circulates storage to record video. So, when recourse to the "human flesh search", due to the events occurred a long time ago, the video taken by other car video recorder has been overwritten or destroyed by other factors, thus unable to retain the relevant video in other car video recorder.

In some technology-related literatures, for example, one discloses a method of shared car video recorder video by a group of cars, when any car accident in a group occurs, the car video recorder of this car is triggered, and an accident video is transmitted to a central server. When other car enters into a predetermined communication range, the server will take the initiative to determine the group that the car belongs to and transmit the upload video to the car video recorder. This method transmits video to a central server, and then this video is transmitted to other cars in the group.

Another literature discloses a processing method and device of a traffic accident, the technology determines if the occurrence of an impact event by detecting the vibration state of the car. This impact event information includes the video, the speed, and driving information, etc., and transmits the information of the impact event to a traffic management center as the basis to restore the accident site and determine the responsibility. This technology needs to transmit the video data of the car accident to the central server, such as a traffic management center.

Yet another literature discloses a technology of real-time traffic monitoring system. This system links to the video encoder, global positioning system, and on-board diagnostics phase 2 (OBD-II). This system obtains car dynamic information and transmits the information by using the third-generation (3G) mobile communications technology module, and combines with Geographic Information System (GIS) for performing car monitoring. This system does not integrate video data of other cars, and needs to upload car monitoring data regularly to the central server, such as a traffic monitoring center.

SUMMARY

The exemplary embodiments of the present disclosure may provide a cooperative event data record system and method.

One exemplary embodiment relates to a cooperative event data record system. The system comprises an in-car system working cooperatively with a communication system. The in-car system may further include a communication module, a cooperative event record processing unit, and an impact determination module. The communication system has a communication module element. The cooperative event record processing unit is connected to the communication module, the impact determination module, and an event data record unit. The impact determination module transmits an alarm to the cooperative event record processing unit. The communication module transmits a request from cooperative event record processing unit to the communication module element, and receives a response from the communication module element. The cooperative event record processing unit, according to the response transmitted from the communication module, stores at least a video data to the event data record unit, or retrieves video data from the event data record unit.

Another exemplary embodiment relates to a cooperative event data record method adapted to an in-car system. The in-car system may include a communication module, a cooperative event record processing unit, and an impact determination module. The method comprises: transmitting an alarm to the cooperative event record processing unit by using the impact determination module; transmitting a request from the cooperative event record processing unit to a communication module element through the communication module; transmitting back a response via the communication module element to the communication module; and according to at least a response transmitted from the communication module, storing video data to or retrieving video data from the event data record unit by the cooperative event record processing unit.

The foregoing and other features of the exemplary embodiments will become better understood from a careful reading of detailed description provided herein below with appropriate reference to the accompanying drawings.

DETAILED DESCRIPTION OF THE EXEMPLARY EMBODIMENTS

Figure 1:
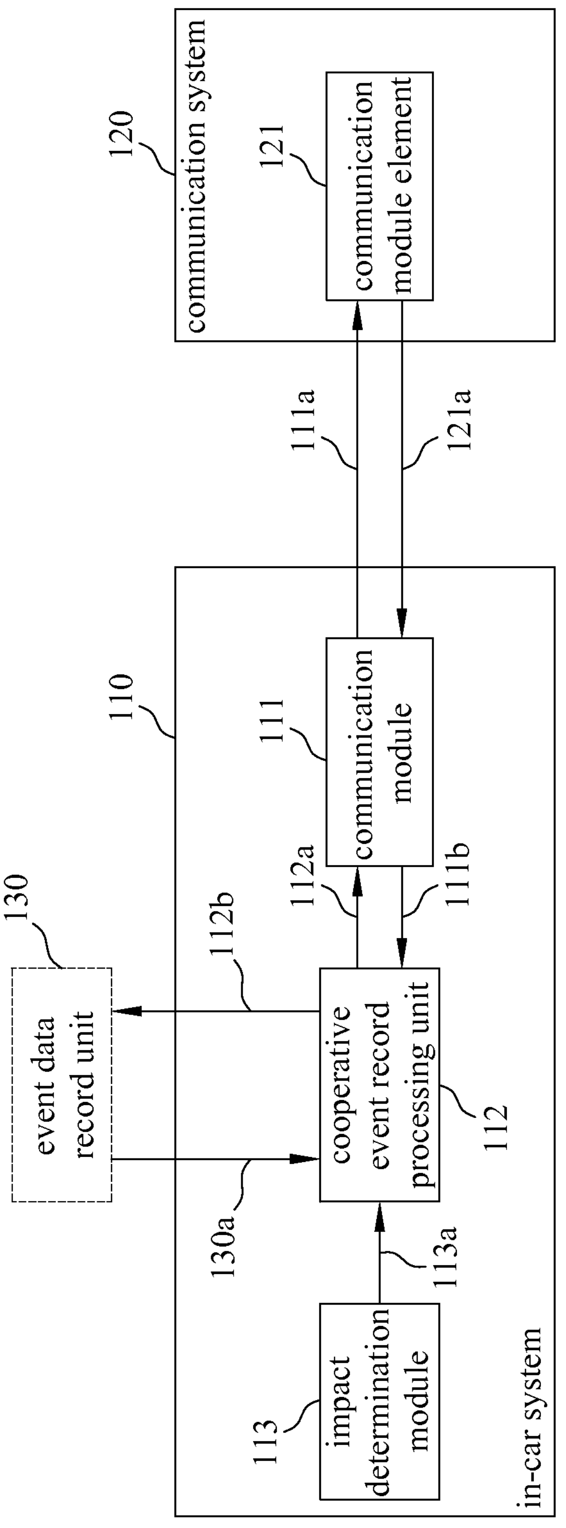
FIG. 1 shows an exemplary schematic view illustrating a cooperative event data record system, according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosed exemplary embodiments provide a technology of cooperative event data record. This technology enhances the effectiveness of event data record through simultaneous collecting video videos taken from neighboring cars.

When a car accident occurs, it is usually needed for obtaining the relevant information from the neighboring car or the road side equipment having video recording functions, in order to complement the shortage of possible insufficient information taken from the accident car itself.

When a car accident occurs, there are two cases to be investigated after the accident car determines occurrence of an accident and transmits an alarm to inform neighboring cars. The first one is the car video recorder of the accident car may continue to operate. Under this situation, the car holding the critical video may drive away in an instant, when the accident occurs. Therefore, it is needed to select at least one suitable car to perform data transmission within a limited time. The second one is the car video recorder of the accident car may not sustain operation. Under the situation, one or more neighboring cars may upload the critical record to backend database to perform backup when the accident occurs, for determination of accident responsibility.

FIG. 1 shows an exemplary schematic view illustrating a cooperative event data record system, according to an exemplary embodiment. As shown in FIG. 1, the system comprises an in-car system 110, collaboration working cooperatively with a communication system 120. The in-car system 110 may further include a communication module 111, a cooperative event record processing unit 112, and an impact determination module 113. The communication system 120 has a communication module element 121. The cooperative event record processing unit 112 is connected to the communication module 111, the impact determination module 113, and an event data record unit 130. The impact determination module 113 transmits an alarm 113*a* to the cooperative event record processing unit 112. The communication module 111 transmits a request 112*a* from the cooperative event record processing unit 112 to the communication module element 121, and receives a response 121*a* from the communication module element 121. The cooperative event record processing unit 112, according to the response 111*b* transmitted from the communication module 111, stores at least a video data 112*b* to the event data record unit 130, or retrieves video data, such as the shown label 130*a*, from the event data record unit 130.

The event data record unit 130 may be, such as, an external recording device, a built-in recording device, or a wireless recording device. The event data record unit 130 records event video data or any other related information, such as, by using the video camera or the global positioning system. This video data may be, but not limited to, a combination of information of a video image, a media containing sound, a car location, and a car driving speed. The request 112*a* is, such as, an accident notification or a video request. The response 121*a* is, such as, a response of an accident or a video data. The impact determination module 113, according to the signal transmitted from an impact sensor or other sensors, determines if to transmit a signal 113*a* to the cooperative event record processing unit 112.

The communication system 120 may be configured as a second in-car system, a backend system, or such as a road side equipment having a system with communication and record functions. The following provides a number of exemplary embodiments to illustrate the system architecture of communication system and an in-car system working cooperatively.

Figure 2:
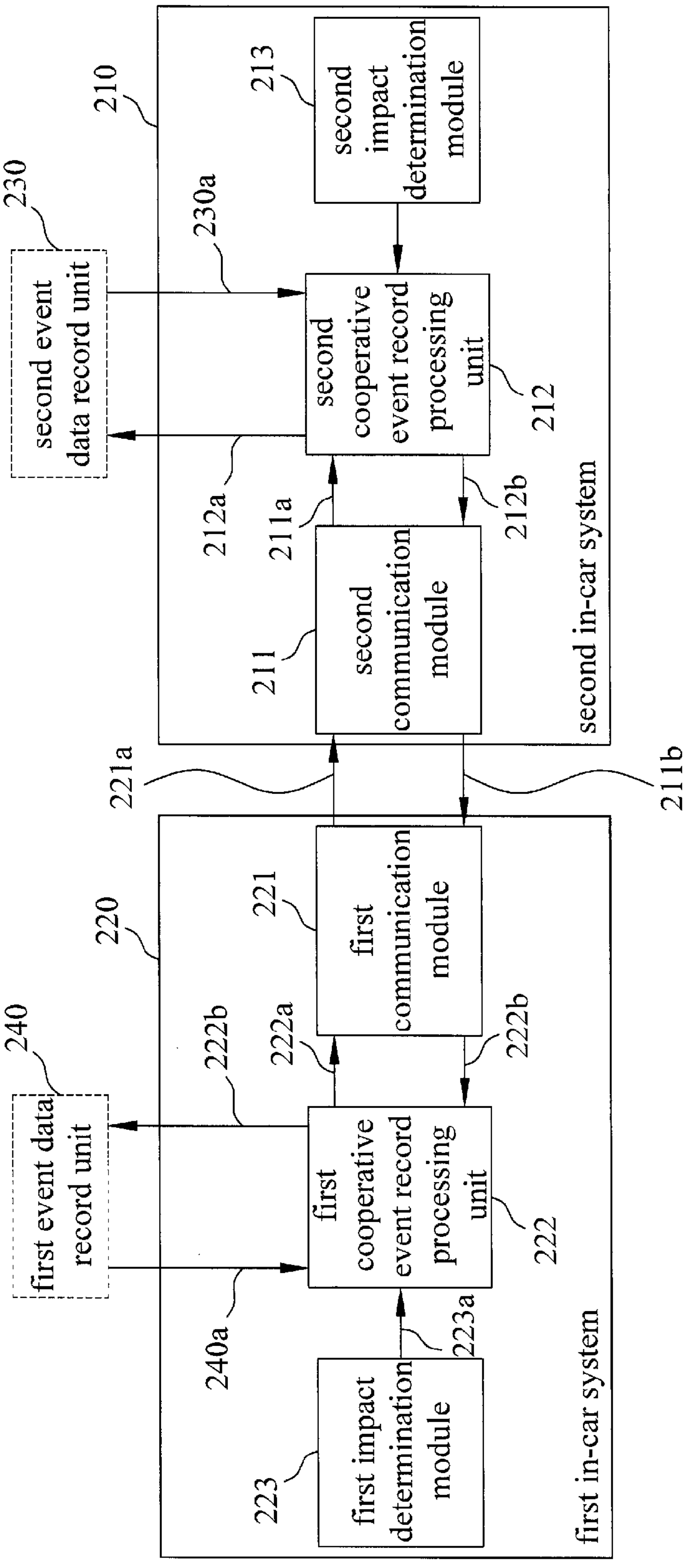
FIG. 2 shows an exemplary schematic view illustrating architecture of a first in-car system and a second in-car system working cooperatively, according to an exemplary embodiment.

FIG. 2 shows an exemplary schematic view illustrating architecture of a first in-car system and a second in-car system working cooperatively, according to an exemplary embodiment. Refer to FIG. 2, a second in-car system 210 may comprise a second communication module 211, a second cooperative event record processing unit 212, and a second impact determination module 213. The second cooperative event record processing unit 212 is connected to the second communication module 211, the second impact determination module 213, and a second even data record unit 230, respectively. The first impact determination module 223 of the first in-car system 220 transmits an alarm 223*a* to the first cooperative event record processing unit 222. The first communication module 221 transmits a request 222*a* from the first cooperative event record processing unit 222 to the second communication module 211 of the second in-car system 210.

The second communication module 211 transmits a request 211*a* to the second cooperative event record processing unit 212. The second cooperative event record processing unit 212, according to the request 211*a*, transmits a request 212*a* to the second event data record unit 230, retrieves video data 230*a* from the second even data record unit 230, and transmits the retrieved video data 212*b* to the second communication module 211. The first communication module 221 transmits the received video data 211*b* to the first cooperative event record processing unit 222. The video 222*b* retrieved by the first cooperative event record processing unit 222 is stored in a first event data record unit 240, for providing subsequent evidences.

Figure 3:
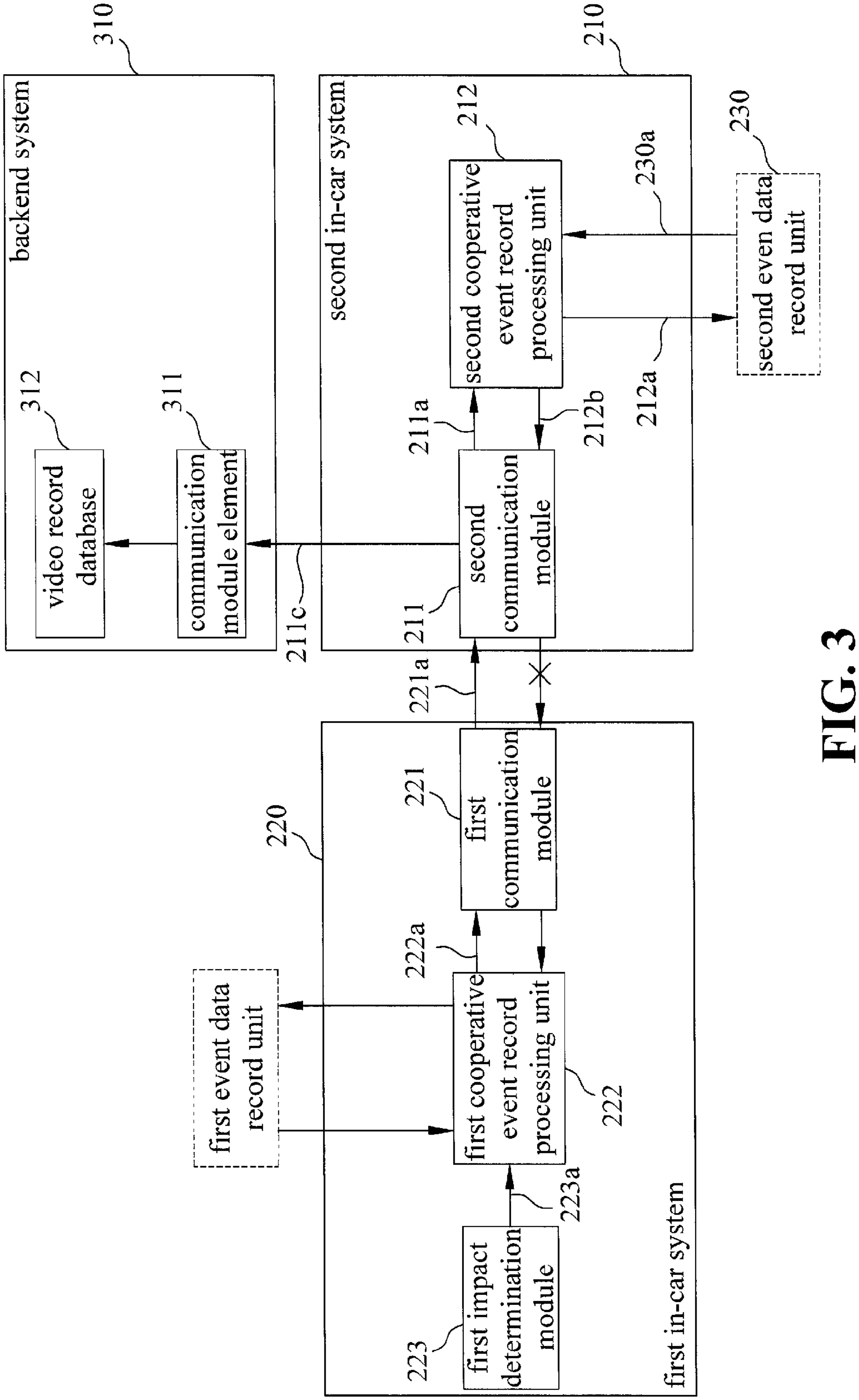
FIG. 3 shows an exemplary schematic view illustrating architecture of a second in-car system, a backend system, and a first in-car system working cooperatively, according to an exemplary embodiment.

FIG. 3 shows an exemplary schematic view illustrating architecture of a second in-car system, a backend system, and a first in-car system working cooperatively, according to an exemplary embodiment. As shown in FIG. 3, the backend system 310 includes a communication module element 311 and a video record database 312. The communication module element 311 is connected to the video record database 312. The first impact determination module 223 of the first in-car system 220 transmits a signal 223*a* to the first cooperative event record processing unit 222, and the first communication module 221 transmits a request 222*a* from first cooperative event record processing unit 222 to the second communication module 211 of the second in-car system 210.

The second communication module 211 transmits the received request 221*a* to the cooperative event record processing unit 212. The second cooperative event record processing unit 212, according to the request 211*a*, retrieves the video data 230*a* from the second event data record unit 230, and transmits the retrieved video data 212*b* to the second communication module 211. When the second communication module 211 in the second in-car system 210 fails to transmit the video data 212*b* to the first communication module 221, the second communication module 211 changes to transmit the retrieved video data 211*c* to the communication module element 311 of the backend systems 310. The communication module element 311 of the backend system 310 stores the retrieved video in the video record database 312, for providing subsequent evidences.

Figure 4:
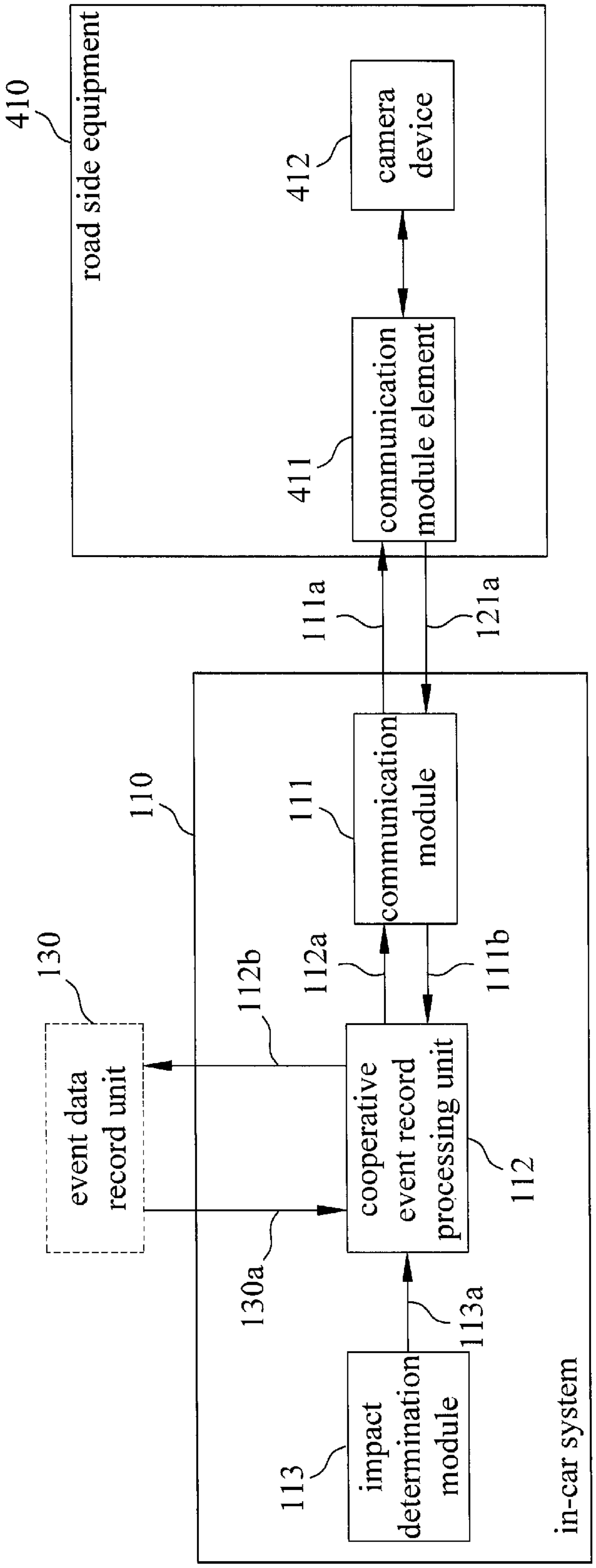
FIG. 4 shows an exemplary schematic view illustrating architecture of road side equipment and an in-car system working cooperatively, according to an exemplary embodiment.

FIG. 4 shows an exemplary schematic view illustrating architecture of road side equipment and an in-car system working cooperatively, according to an exemplary embodiment. As shown in FIG. 4, road side equipment 410 comprises a communication module element 411 and a camera device 412, wherein the communication module element 411 is connected to the camera device 412. The communication module element 411 receives a request 111*a* transmitted from the communication module 111, and transmits the video data within the camera device 412 to the communication module 111. The cooperative event record processing unit 112 receives the video data 111*b* transmitted from the communication module 111, and stores the video data 112*b* to the event data record unit 130.

Figure 5:
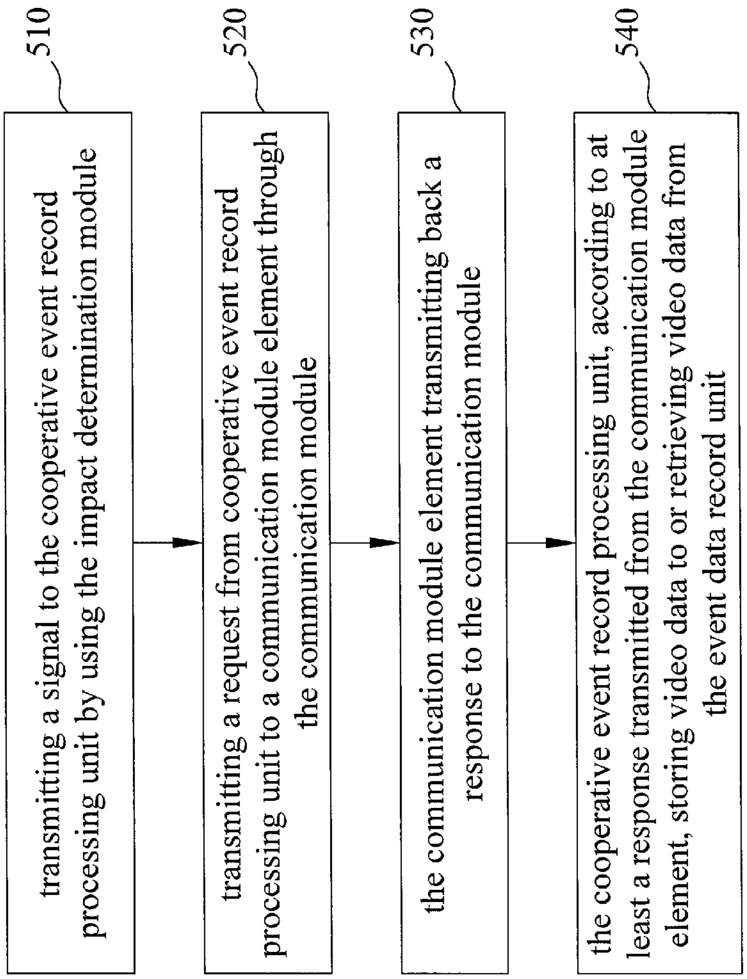
FIG. 5 shows an exemplary schematic view illustrating a cooperative event data record method, according to an exemplary embodiment.

FIG. 5 shows an exemplary schematic view illustrating a cooperative event data record method, according to an exemplary embodiment. The cooperative event data record method may be applied in a in-car system having a communication module, a cooperative event record processing unit, and an impact determination module. The method comprises: transmitting a signal to the cooperative event record processing unit by using the impact determination module, as shown in step 510; transmitting a request from cooperative event record processing unit to a communication module element through the communication module, as shown in step 520; transmitting back a response to the communication module, by the communication module element, as shown in step 530; according to at least a response transmitted from the communication module element, storing video data to or retrieving video data from the event data record unit, by the cooperative event record processing unit, as shown in step 540.

Figure 6:
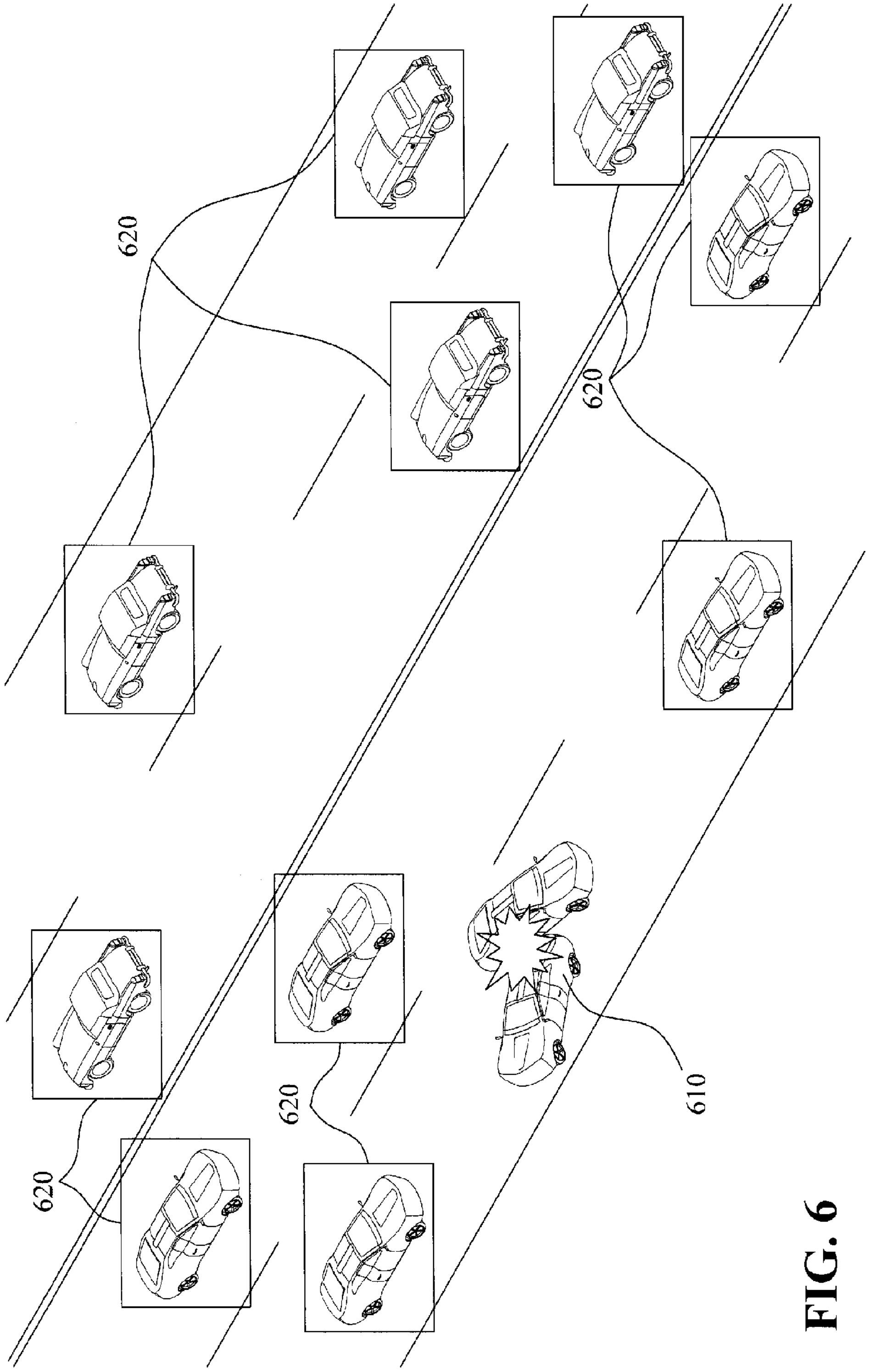
FIG. 6 shows an exemplary scenario view illustrating the transmission of the message and video data between an accident car and neighboring cars when an accident occurs, according to an exemplary embodiment.

FIG. 6 shows an exemplary scenario view illustrating the transmission of the message and video data between an accident car and neighboring cars when an accident occurs, according to an exemplary embodiment. As shown in FIG. 6, when an accident occurred, the accident car 610 transmits a notification to one or more neighboring cars in the vicinity of the accident. The accident car 610 or one or more neighboring cars 620 may each be equipped with an in-car system for performing mutual transmission of message and video data between each other, such as a plurality of neighboring cars 620 shown in FIG. 6, each neighboring car, according to the notification, determines critical video data in its own video record unit, and transmits a response to the accident car 610. The accident car 610 selects one or more critical neighboring cars from responding neighboring cars 620, and requests the at least one selected critical neighboring car to transmit critical video data.

Figure 7:
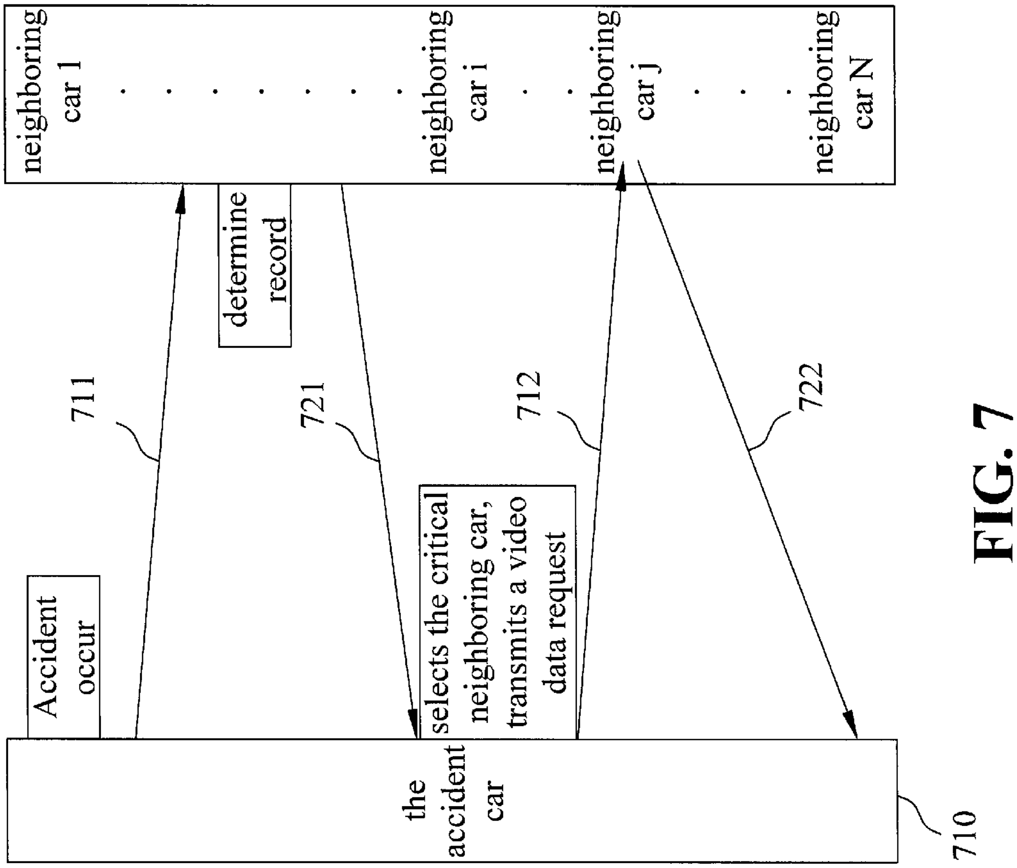
FIG. 7 shows an exemplary flow chart illustrating an accident car requests the neighboring cars transmitting video data to the accident car, according to an exemplary embodiment.

FIG. 7 shows an exemplary flow chart illustrating an accident car requests the neighboring cars transmitting video data to an accident car, according to an exemplary embodiment. As shown in FIG. 7, the accident car 710 determines an accident occurred, and transmits a notification 711 to all neighboring cars (for example, neighboring car 1 to the neighboring car N, N>=1). This notification 711 may contain information of the accident car identification (ID), the accident location, and the accident time, etc. Each neighboring car, according to the notification 711, determines if there is critical information in the records of the event data record unit, and transmits a response 721 to the accident car 710. The response 721 may contain such as information of the accident car identification (ID), the neighboring car ID, and the neighboring car location, etc. The accident car 710, according to this response 721, selects at least one critical neighboring car, such as the neighboring car j, and transmits a video data request 712 to the selected critical neighboring car (such as neighboring car j). The video data request 712 may contain information such as the accident car ID, and the critical neighboring car ID, etc. The critical neighboring car (such as the neighboring car j) transmits the video data 722 within a specific time to the accident car 710.

Figure 8:
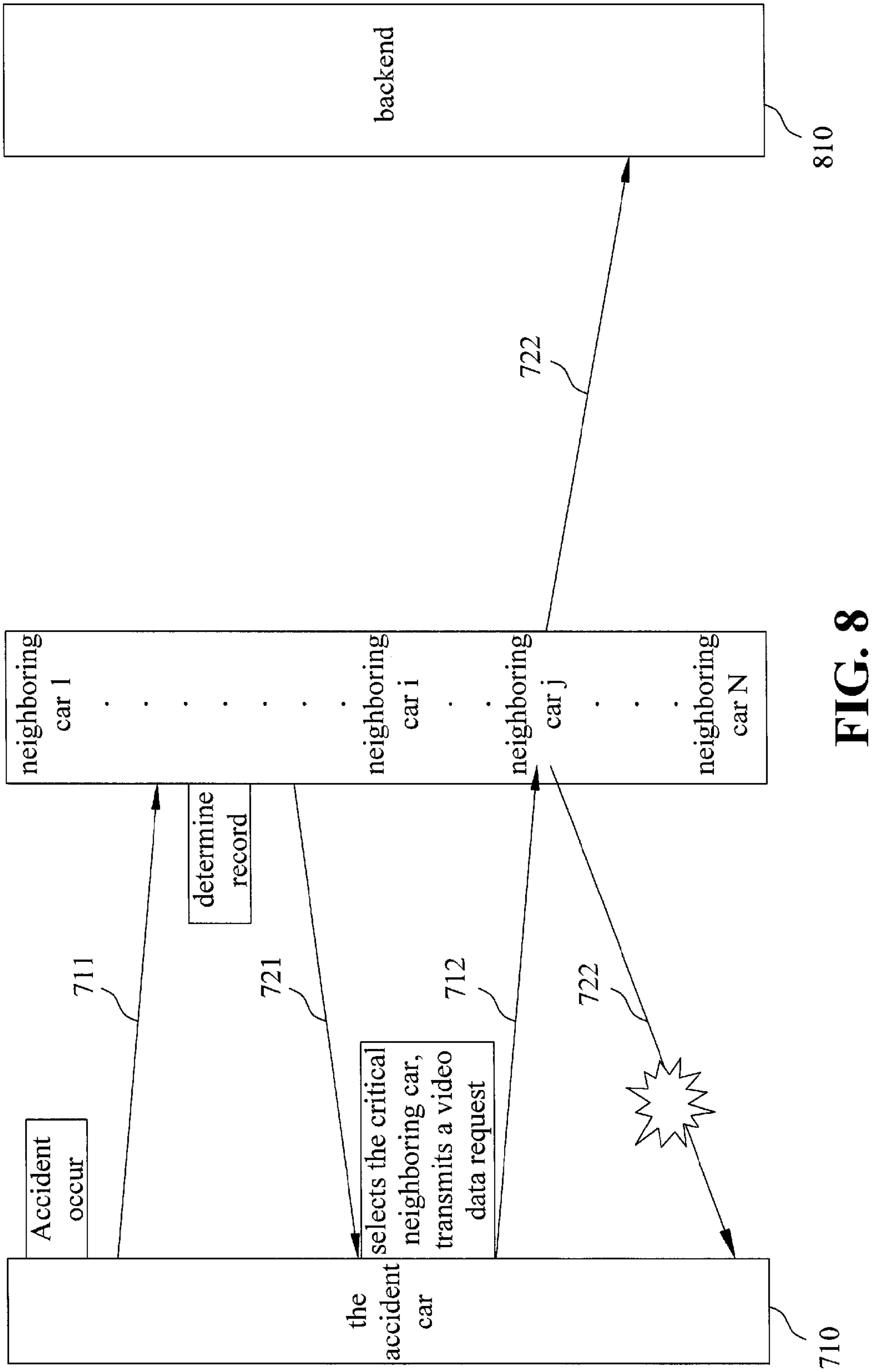
FIG. 8 shows an exemplary flow chart illustrating the accident car and the neighboring cars fail to complete the transmission of video data, and video data is transmitted to the backend for storage, according to an exemplary embodiment.

FIG. 8 shows an exemplary flow chart illustrating the accident car and the neighboring cars fail to complete the transmission of video data, and video data is transmitted to the backend for storage, according to an exemplary embodiment. As shown in FIG. 8, the accident car 710 determines an accident occurs, and transmits a notification 711 to each neighboring car. This notification may contain information such as the accident car ID, the accident car location, the accident time, etc. Each neighboring car, according to the notification 711, determines if the records in the event data record unit have the critical information, and transmits a response 721 to the accident car 710. This response may contain information such as the accident car ID, the neighboring car ID, the neighboring car location, etc. The accident car 710 selects critical neighboring car such as the neighboring car j according to the response 721, and transmits a video data request 712 to the selected neighboring car. The video data request 712 may contain information such as the accident car ID, and the critical neighboring car ID, etc. If the critical neighboring car (such as the neighboring car j) fails to completely transmit the video data 722 within a specific time to the accident car 710, then it transmits the video data 722 within this specific time to the backend 810 for storage.

Figure 9:
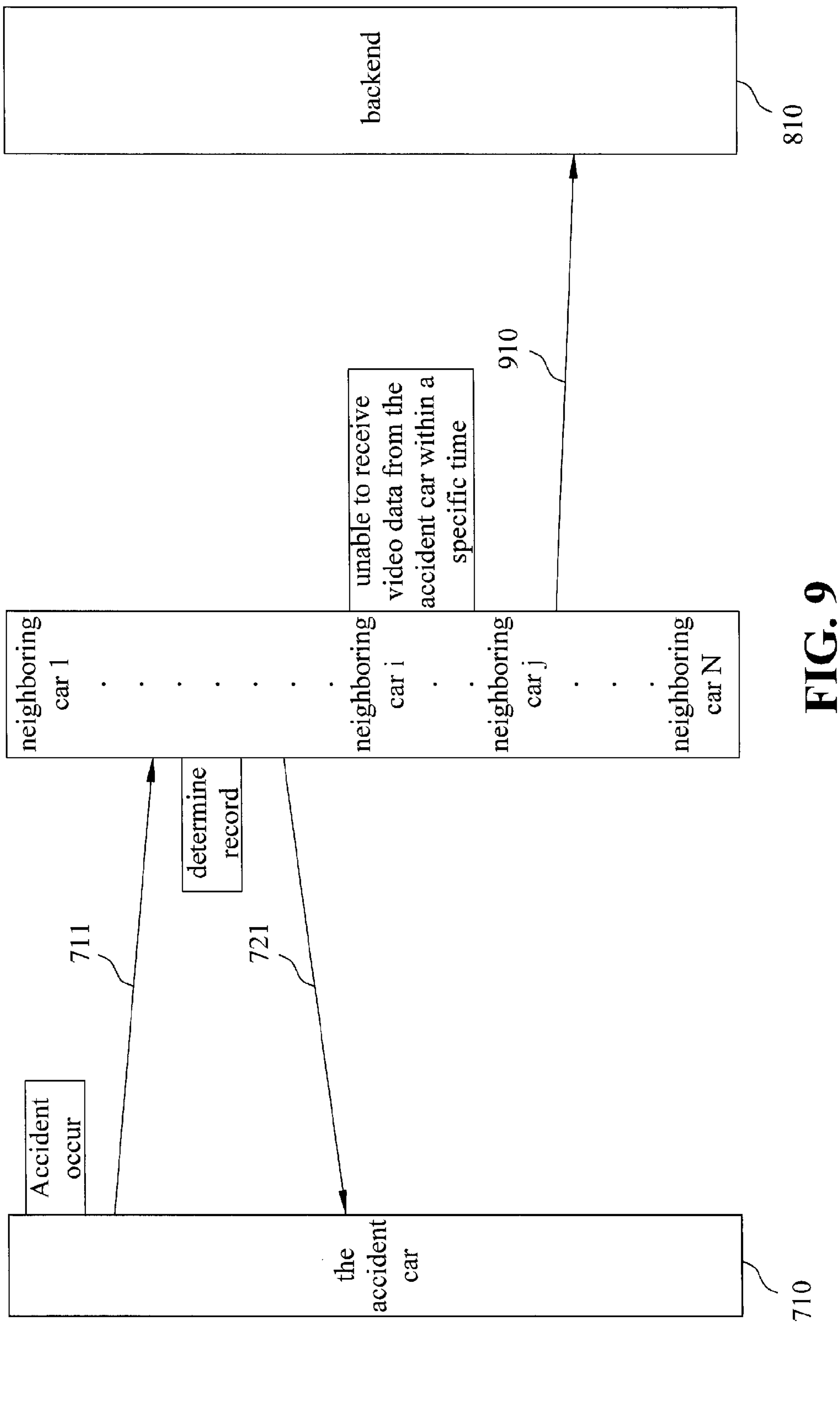
FIG. 9 shows an exemplary flow chart illustrating the accident car does not require a transmission of video data from neighboring cars, and the neighborhood cars may directly upload video data to the backend for storage, according to an exemplary embodiment.

FIG. 9 shows an exemplary flow chart illustrating the accident car does not require a transmission of video data from neighboring cars, and the neighborhood cars may directly upload video data to the backend for storage, according to an exemplary embodiment. As shown in FIG. 9, the accident car 710 determines an accident occurred, and transmits a notification 711 to each neighboring car. This notification may contain information such as the accident car ID, the accident car location, the accident time, etc. Each neighboring car, according to the notification 711, determines if the records in the event data record unit have the critical information, and transmits a response 721 to accident car 710. This response may contain information such as the accident car ID, the neighboring car ID, the neighboring car location, etc. If each neighboring car fails to receive the request for transmitting video data from the accident car 710 within a specific time, then each neighboring car transmits video data 910 to the backend 810 for storage.

Figure 10:
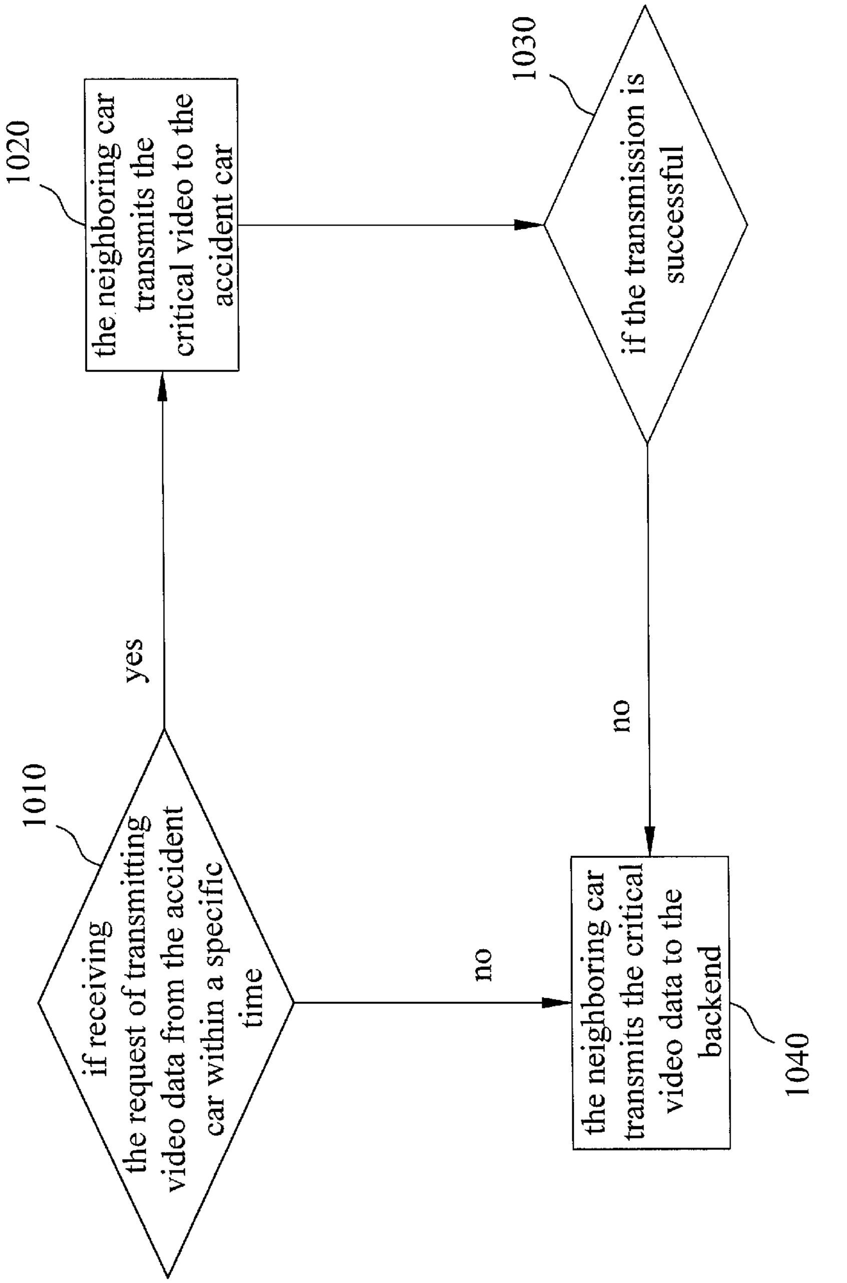
FIG. 10 shows an exemplary flow chart illustrating a neighboring car determines if it transmits video data to the backend, according to an exemplary embodiment.

FIG. 10 shows an exemplary flow chart illustrating a neighboring car determines if it transmits video data to the backend, according to an exemplary embodiment. As shown in FIG. 10, the neighboring car determines if it receives a request of transmitting video data (step 1010). When the neighboring car is requested to transmit video data to the accident car, then the neighboring car transmits the critical video to the accident car (step 1020), and confirms if the transmission is successful (step 1030). When the critical video data has not been successfully transmitted to the accident car, then the neighboring car transmits the critical video data to the backend (step 1040). Similarly, when the neighboring car does not receive the request of transmitting video data from the accident car within a predefined time, then the neighboring car transmits the video data to the backend (step 1040).

Figure 11:
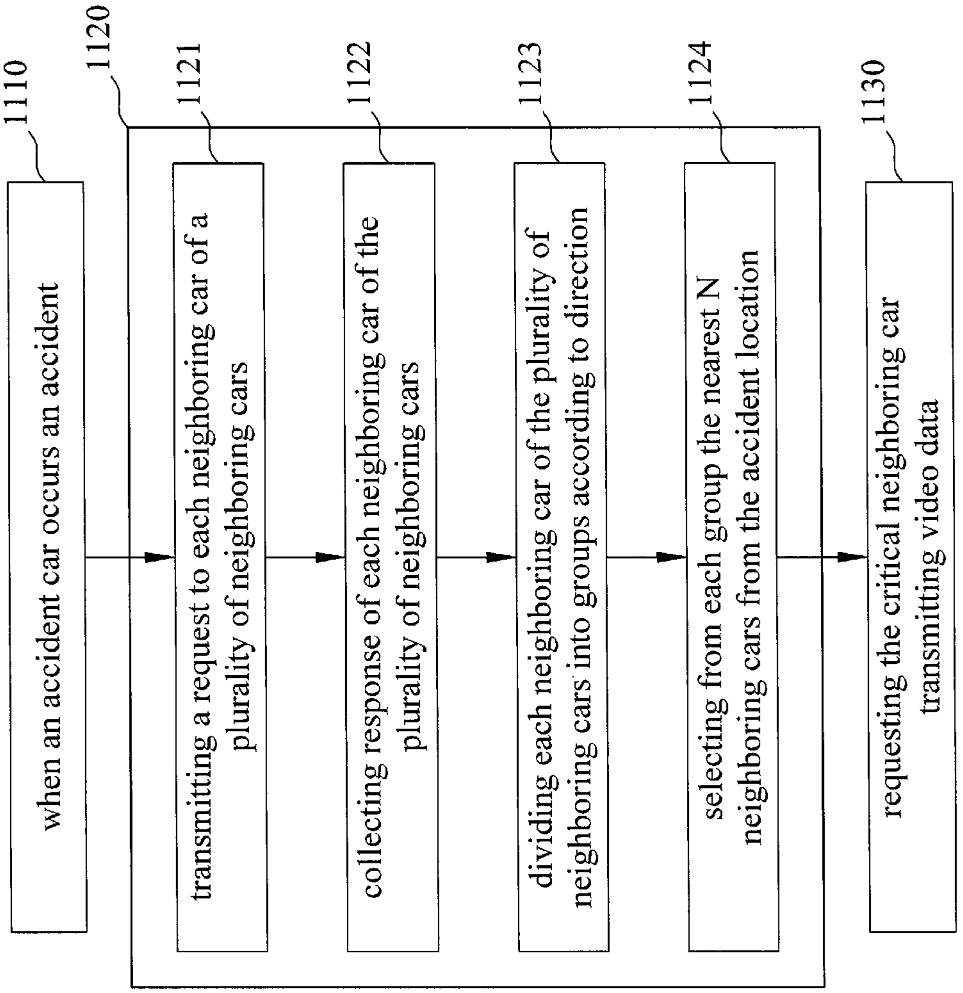
FIG. 11 shows an exemplary flow chart illustrating how the accident car selects at least one critical neighboring car, according to an exemplary embodiment.

FIG. 11 shows an exemplary flow chart illustrating how the accident car selects at least one critical neighboring car, according to an exemplary embodiment. As shown in FIG. 11, when an accident occurs (step 1110), the accident car selects at least one critical neighboring car (step 1120), and requests the critical neighboring car to transmit video data (step 1130), wherein step 1120 is determined by each of a plurality of neighboring cars and the distance or direction of at least an accident position, such as the accident car may transmit a request to each of a plurality of neighboring cars (step 1121); the accident car may collect responses from each of the plurality of neighboring cars within a time limit T (step 1122); and with an accident center as the center, divides the plurality of neighboring cars into groups according to the location or the direction of the neighboring car (step 1123); and selects from each group the nearest N neighboring cars at the accident location (step 1124), wherein N is a predetermined integer.

Figure 12:
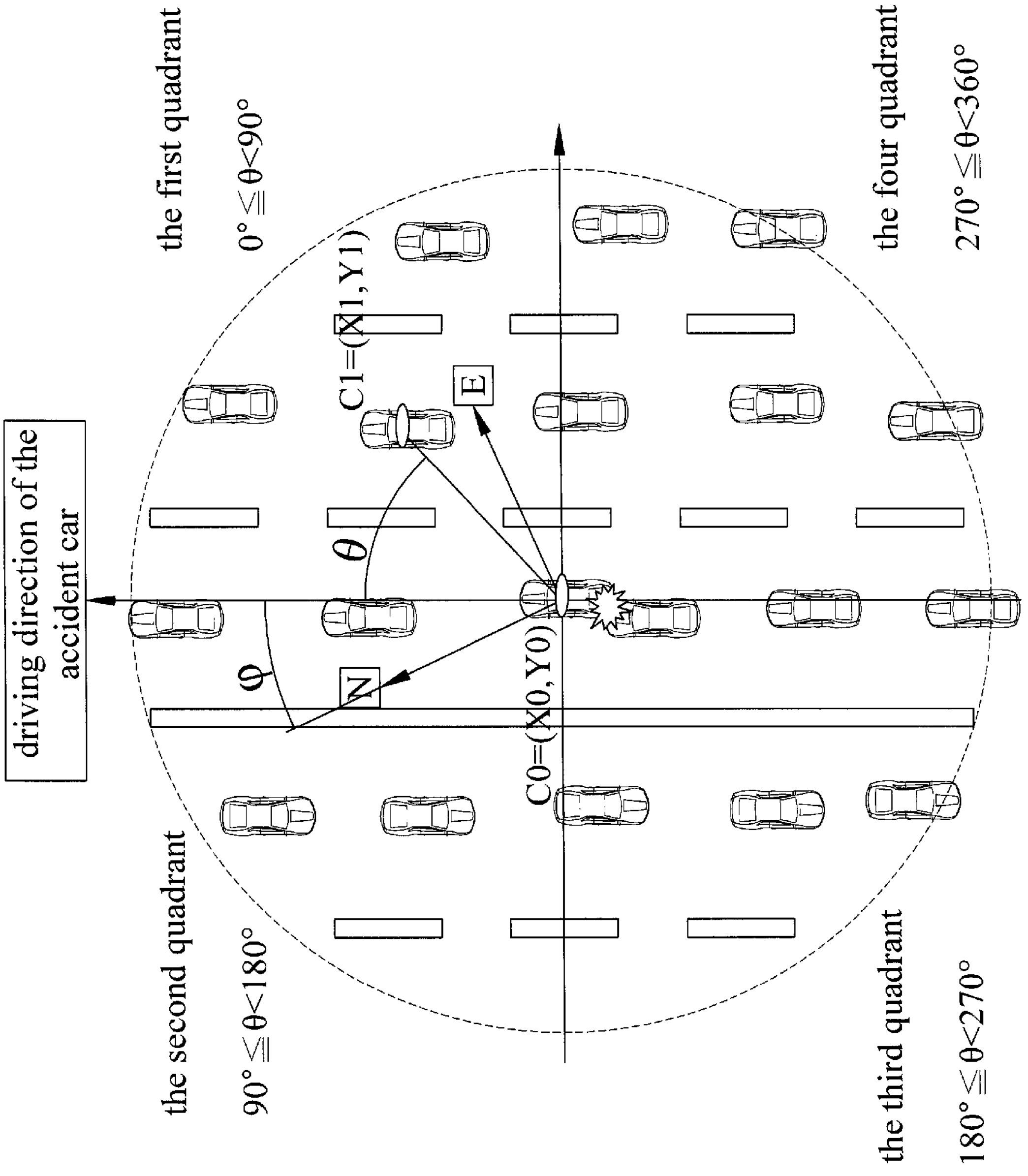
FIG. 12 shows an exemplary schematic diagram illustrating how the accident car groups the neighboring cars and selects the at least one critical neighboring car based on FIG. 11, according to an exemplary embodiment.

FIG. 12 shows an exemplary schematic diagram illustrating how the accident car groups the neighboring cars and selects the at least one critical neighboring car based on FIG. 11, according to an exemplary embodiment. The neighboring cars are divided into four groups with four quadrants in this exemplary embodiment. As shown in FIG. 12, C0 represents the accident car, C1 represents the neighboring car, and the four quadrants are arranged counterclockwise. The driving direction of the accident car is from the first quadrant to the second quadrant. Defines $V=(X, Y)=C1-C0=((X1-X0), (Y1-Y0))$, where V is a vector.

When the $X\geq 0$ and $Y\geq 0$, then C1 is located in the first quadrant;

When X 0 and $Y\geq 0$, then C1 is located in the second quadrant;

When X 0 and Y 0, then C1 is located in the third quadrant; and

When $X\geq 0$ and Y 0, then C1 is located in the fourth quadrant.

Wherein C0, C1 indicate the locations represented by a plane coordinate system. If the known location of the car is a coordinate of a Global Positioning System (GPS), then the location is converted into the location represented by the plane coordinate system.

Figure 13:
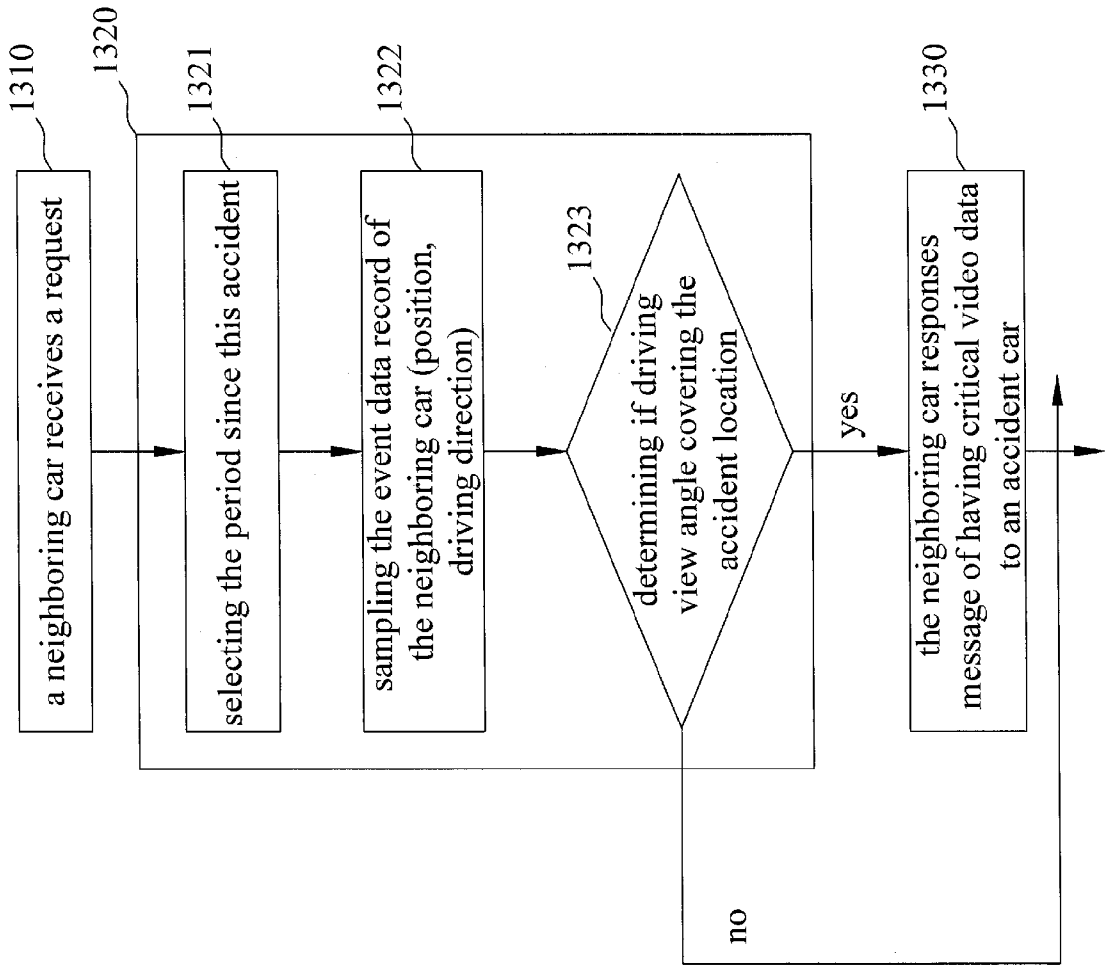
FIG. 13 shows an exemplary flowchart illustrating how a neighboring car determines if it has the critical video data, according to an exemplary embodiment.

FIG. 13 shows an exemplary flowchart illustrating how a neighboring car determines if it has the critical video data, according to an exemplary embodiment. As shown in FIG. 13, when one of the plurality of neighboring cars receives a request (step 1310), the neighboring car determines if it has critical video data (step 1320). If the neighboring car determines it has the critical video data, then the neighboring car responds a message of having critical video data to an accident car (step 1330); otherwise, then it does not respond any message to the car accident. Wherein step 1320, for example, may further include selecting a period since this accident occurs (1321), and sampling the event data record of the neighboring car within the period, such as information of location, driving direction, etc. (step 1322); then determining if the view angle recorded by the event data record unit of the neighboring car covers the accident location (step 1323).

Figure 14:
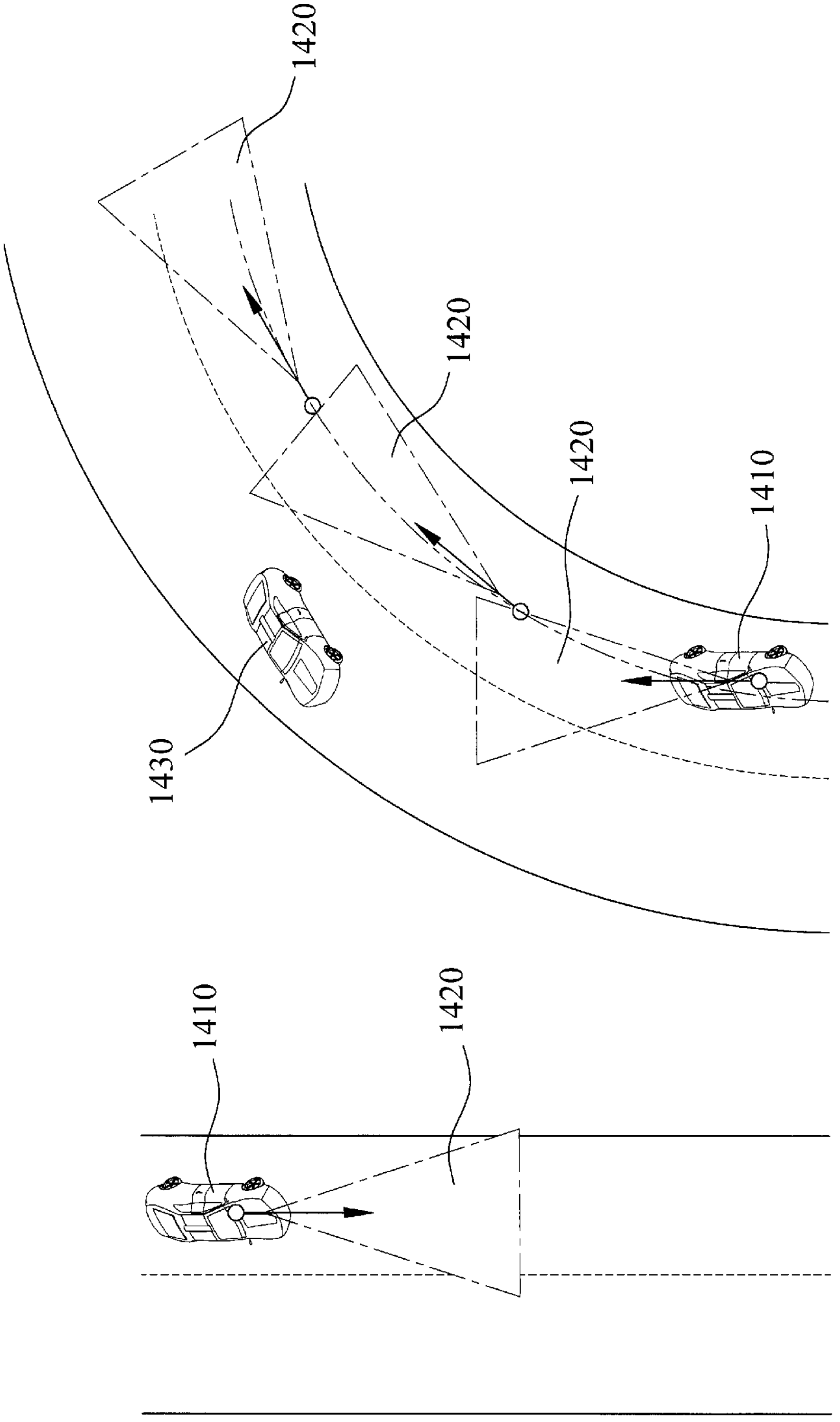
FIG. 14 shows an exemplary schematic view of determination mechanism illustrating if the video data in the event data record unit of the neighboring car contains critical video data, according to an exemplary embodiment.

FIG. 14 shows an exemplary schematic view of determination mechanism illustrating if the video data in the event data record unit of the neighboring car contains critical video data, according to an exemplary embodiment. As shown in FIG. 14, the triangular block in front of the neighboring car 1410 is a visible range for the event data record unit 1420. The arrow within this visible range indicates the driving direction of the neighboring car 1410. A determination mechanism for determining if the video data in the event data record unit of the neighboring car contains critical video data of the accident car 1430, may be determined according to the information, such as, at least a driving direction of the neighboring car, at least a global positioning system coordinate, at least a view angle of video camera, and at least a global positioning system coordinate of the accident car, etc.

Figure 15:
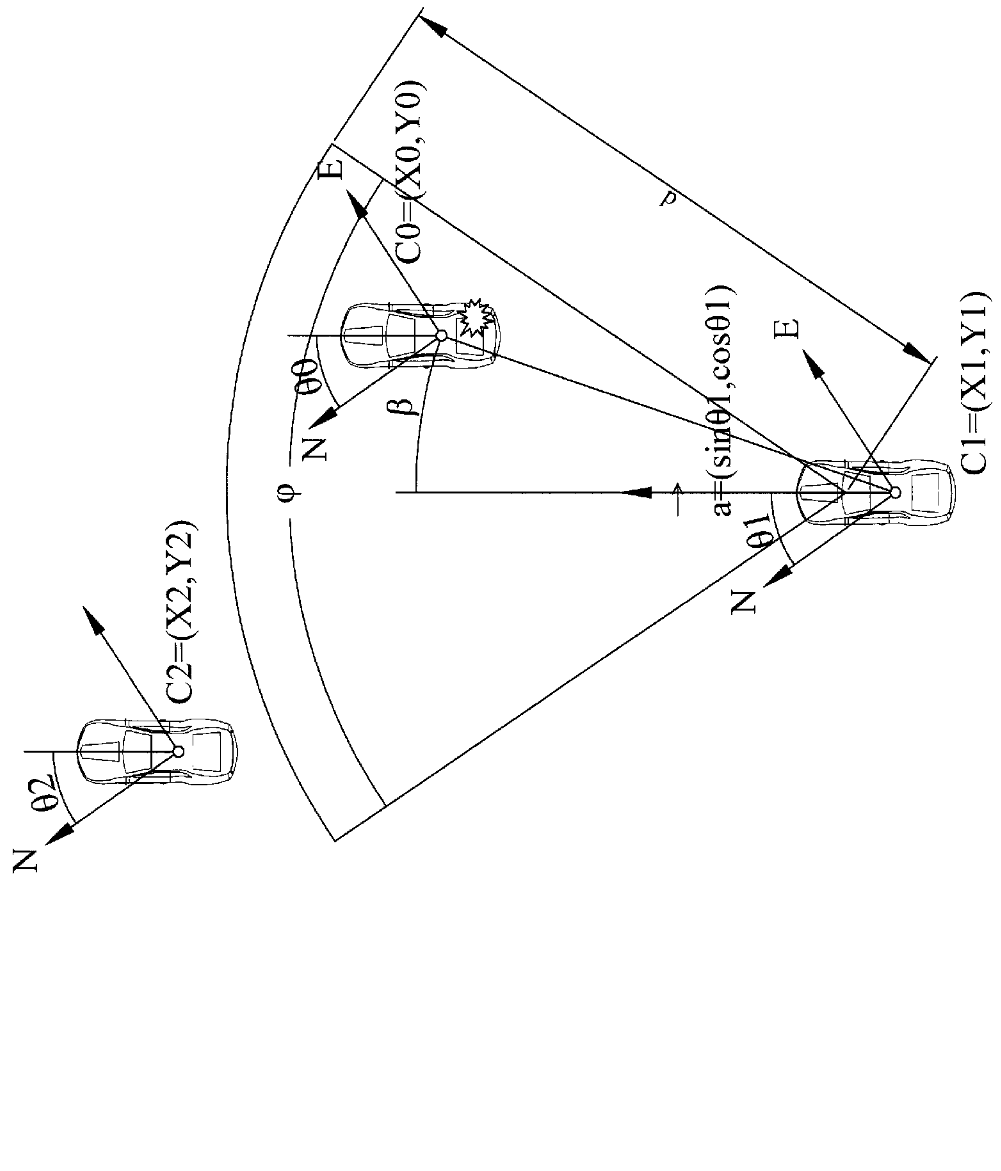
FIG. 15 shows an exemplary schematic diagram illustrating a determination mechanism for the critical video data by utilizing a view angle algorithm, according to an exemplary embodiment.

FIG. 15 shows an exemplary schematic diagram illustrating a determination mechanism for the critical video data by utilizing a view angle algorithm, according to an exemplary embodiment. Assumed that the horizontal view angle of video camera in the neighboring car is φ (such as 80)°; the shooting (clear) distance of this video camera is d; the driving angle of the neighboring car is θ1 (such as the angle between the driving direction and the northern direction N); β is the angle between the driving direction of the neighboring car and the driving direction of the accident car; the accident occurs at absolute time T0; and the time length of video required to upload is T. As shown in FIG. 15, within the time duration between T0−T and T0, the mechanism checks if the video camera shoots the accident (the scene of the accident locates within the restricted distance range) every each interval t' (t' is a predetermined time, such as 0.1 second). The following is an exemplar to determine if the accident locates within the view range.

If |β| φ/2 and |C1−C0|d, then the accident locates located within the view rang, wherein $$\cos\beta = \frac{\vec{a}\cdot\overrightarrow{C0-C1}}{|\vec{a}|\cdot|\overrightarrow{C0-C1}|}$$

$$\vec{a} = (\cos\theta 1, \sin\theta 1)$$

$\vec{a}$ denotes a unit vector of the driving direction of the neighboring car;

C0=(X0, Y0), represents the location of the accident car; and C1=(X1, Y1), represents the location of the neighboring car. Wherein C0, C1 indicate the locations represented by a plane coordinate system. If the known location of the car is a coordinate of a Global Positioning System (GPS), it is converted into the location represented by the plane coordinate system.

Accordingly, the following illustrates how to determine an accident car falls within the view range of a neighboring car, according to an exemplary embodiment adapted to the view angle algorithm.

Assumed that $d = 100$ m, $C1$, (0, 0), $$C0 = (10\sqrt{3}, 10),\ \theta 1 = 30°$$

Then $$\vec{a} = (\sin\theta 1, \cos\theta 1) = (1/2, \sqrt{3}/2)$$

$$|C1 - C0| = \sqrt{100\times 3 + 100} = 20 < 100 \text{ m}$$

and $$\cos\beta = \frac{\vec{a}\cdot\overrightarrow{C0-C1}}{|\vec{a}|\cdot|\overrightarrow{C0-C1}|} = \frac{(1/2, \sqrt{3}/2)\cdot(10\sqrt{3}, 10)}{\sqrt{\frac{1}{4}+\frac{3}{4}}\cdot\sqrt{300+100}} = \frac{\sqrt{3}}{2}$$

Thus $\beta = 30° < (80°/2)$

Therefore, it may be seen from |C1−C0| and β that C0 falls within the view range of C1.

Figure 16:
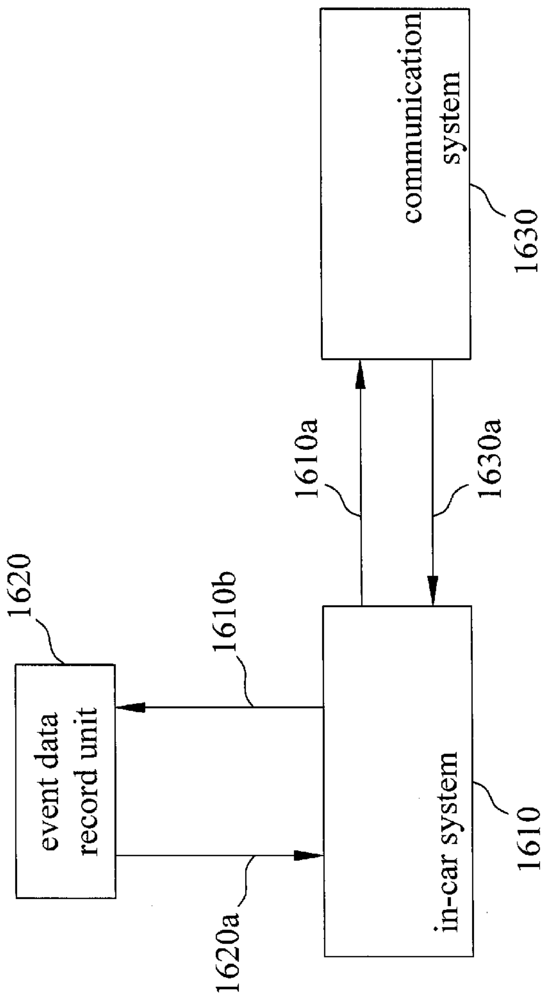
FIG. 16 shows a block diagram illustrating system architecture of an in-car system, an event data record unit, and a communication system, according to an exemplary embodiment.

FIG. 16 shows a block diagram illustrating system architecture of an in-car system, an event data record unit, and a communication system, according to an exemplary embodiment. As shown in FIG. 16, the system architecture comprises an in-car system 1610, an event data record unit 1620, and a communication system 1630. The in-car system 1610 transmits a request 1610*a* to the communication system 1630, and receives a response 1630*a* from the communication system 1630. And, according to the response 1630*a*, in-car system 1610 stores at least a video data 1610*b* to the event data record unit 1620, or retrieves video data 1620*a* from the event data record unit 1620. The detailed operations and functions of this system architecture have been explained in the foregoing description, and will not be repeated here.

In summary, the exemplary embodiments of a cooperative event data record technology may work cooperatively with other cars or systems having the communication module element and video camera functions to quickly obtain useful critical video information, to help restoring scene of accident, or to ensure retention of critical video data, and to clarify accident responsibility.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A cooperative event data record system comprising an in-car system working cooperatively with a communication system having a communication module element, said in-car system comprising:

a communication module, a cooperative event record processing unit, and an impact determination module, and said cooperative event record processing unit being connected respectively to said communication module, said impact determination module, and an event data record unit;

wherein said impact determination module transmits an alarm to said cooperative event record processing unit, said communication module transmits a request from said cooperative event record processing unit to said communication module element, and receives a response from said communication module element, and said cooperative event record processing unit, according to said response transmitted from said communication module, stores at least a video data to an event data record unit or retrieves video data from said event data record unit; and wherein said communication system is configured as a second in-car system, said second in-car system further comprises a second communication module, a second cooperative event record processing unit and a second impact determination module, and said second cooperative event record processing unit is connected respectively to said second communication module, said second impact determination module, and a second event data record unit.

2. The system as claimed in claim 1, wherein said event data record unit uses at least a camera, or at least a global positioning system to record said video data.

3. The system as claimed in claim 2, wherein said video data is information of a combination of a video, a media containing sound, and a location of car.

4. The system as claimed in claim 1, wherein said event data record unit is one of an external record device, an embedded record device, or a wireless record device.

5. The system as claimed in claim 1, wherein said impact determination module, according to at least a signal transmitted from at least one sensor, determines whether to transmit a signal to said cooperative even record processing unit.

6. A cooperative event data record system comprising an in-car system working cooperatively with a communication system having a communication module element, said in-car system comprising:

a communication module, a cooperative event record processing unit, and an impact determination module, and said cooperative event record processing unit being connected respectively to said communication module, said impact determination module, and an event data record unit;

wherein said impact determination module transmits an alarm to said cooperative event record processing unit, said communication module transmits a request from said cooperative event record processing unit to said communication module element, and receives a response from said communication module element, and said cooperative event record processing unit, according to said response transmitted from said communication module, stores at least a video data to an event data record unit or retrieves video data from said event data record unit; and wherein said communication system is configured as a backend system, and said backend system further comprises an video record database, said video record database connects to said communication module element.

7. A cooperative event data record system comprising an in-car system working cooperatively with a communication system having a communication module element, said in-car system comprising:

a communication module, a cooperative event record processing unit, and an impact determination module, and said cooperative event record processing unit being connected respectively to said communication module, said impact determination module, and an event data record unit;

wherein said impact determination module transmits an alarm to said cooperative event record processing unit, said communication module transmits a request from said cooperative event record processing unit to said communication module element, and receives a response from said communication module element, and said cooperative event record processing unit, according to said response transmitted from said communication module, stores at least a video data to an event data record unit or retrieves video data from said event data record unit; and wherein said communication system is configured as a road side equipment, said road side equipment further comprises a camera device, and said camera device is connected to said communication module element.

8. A cooperative event data record method, applicable to an in-car system having a communication module, a cooperative event record processing unit, and an impact determination module, said method comprising:

transmitting by said impact determination module a signal to said cooperative event record processing unit;

transmitting by said communication module a request from said cooperative event record processing unit to a communication module element;

transmitting by said communication module element a response back to said communication module; and according to at least a response transmitted from said communication module, said cooperative event record processing unit retrieving video data from or storing video data to an event data record unit;

wherein when an accident occurs, said method further comprises:

selecting, by said accident car, at least a critical neighboring car; and requesting said at least a critical neighboring car to transmit video data.

9. The method as claimed in claim 8, wherein said step of selecting said at least a critical neighboring car is determined by a corresponding distance or a corresponding direction with respect to at least an accident location for each of a plurality of neighboring cars.

10. The method as claimed in claim 9, wherein when one of said plurality of neighboring cars receives a request, said method further comprises:

said neighboring car determining if it has critical video data; and if having critical video data being determined, then said neighboring car responding a message of having critical video to an accident car;

otherwise, not responding any message to said accident car.

11. The method as claimed in claim 10, wherein said step of said neighboring car determining if it has critical video data further comprises:

selecting a period since said accident occurs;

sampling at least an event data record of said plurality of neighboring cars in said period; and determining if at least a driving view angle recorded in said event data record unit of said neighboring car covering an accident location.

12. The method as claimed in claim 8, wherein when said at least a critical neighboring car is requested to transmit video data to said accident car, said method further comprises:

transmitting critical video data by said at least a critical neighboring car to said accident car;

confirming if the transmission being successful;

when said critical video data having not been successfully transmitted to said accident car, then transmitting said critical video data to a backend; and when said at least a neighboring car does not receiving said request of transmitting video data within a predefined time, then transmitting said video data to said backend.

13. The method as claimed in claim 8, wherein said method further utilizes a view angle algorithm to determine if video data in said event data record unit contains critical video data of said accident car.

14. The method as claimed in claim 13, wherein said view angle algorithm reaches said determination according to at least a driving direction of said critical neighboring car, at least a global positioning system's coordinate of said critical neighboring car, at least a view angle of video camera, and at least a global positioning system's coordinate of said accident car.

* * * * *